Jan. 20, 1959　　　H. R. KARLEN ET AL　　　2,869,760
HOT WATER DISPENSER

Filed June 22, 1956　　　　　　　　　　　4 Sheets-Sheet 1

INVENTORS.
Harvey R. Karlen
David C. Eisendrath
BY
Schroeder, Hofgren,
Brady & Wegner Attys

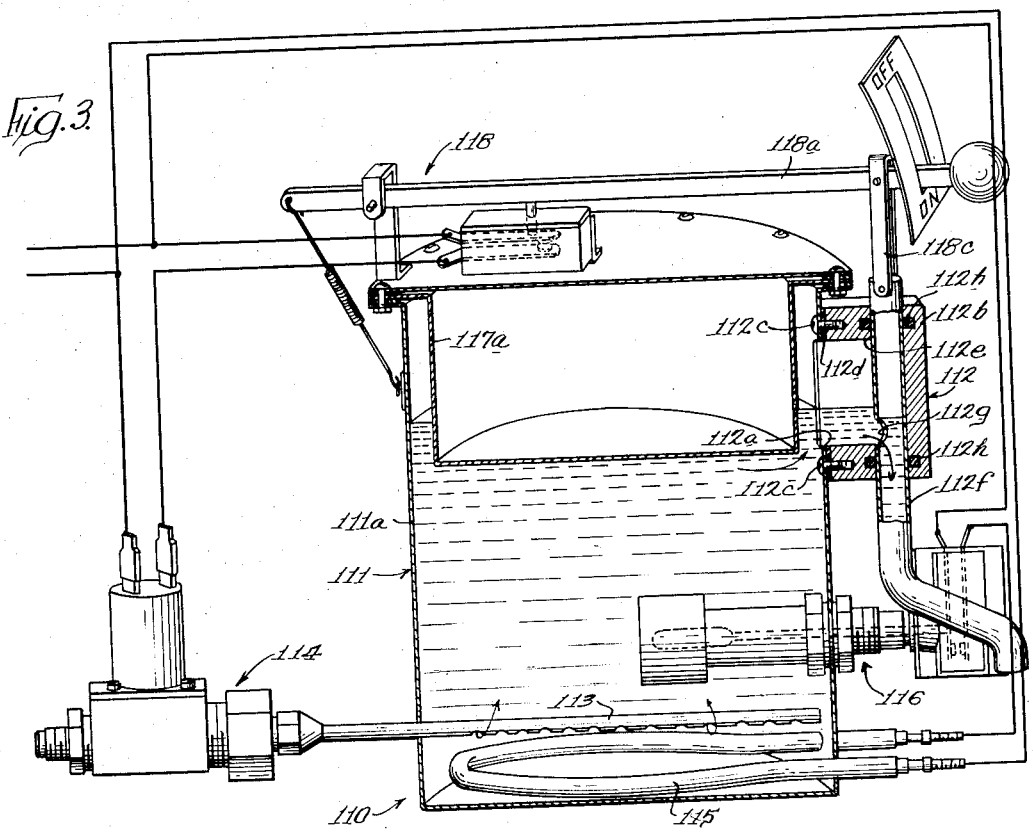
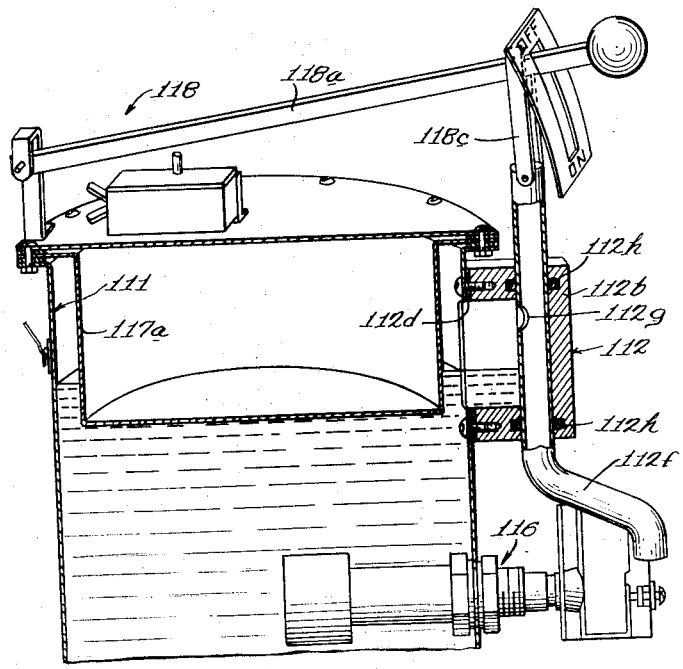

Jan. 20, 1959  H. R. KARLEN ET AL  2,869,760
HOT WATER DISPENSER

Filed June 22, 1956  4 Sheets-Sheet 3

INVENTORS.
Harvey R. Karlen
David C. Eisendrath
BY
Schroeder, Hofgren,
Brady & Wagner Attys.

Jan. 20, 1959    H. R. KARLEN ET AL    2,869,760
HOT WATER DISPENSER
Filed June 22, 1956    4 Sheets-Sheet 4

INVENTORS.
Harvey R. Karlen
David C. Eisendrath
BY
Johnson, Hofgren,
Brady & Wagner Attys.

United States Patent Office 2,869,760
Patented Jan. 20, 1959

2,869,760

HOT WATER DISPENSER

Harvey R. Karlen and David C. Eisendrath, Chicago, Ill., assignors to Cory Corporation, a corporation of Delaware Application June 22, 1956, Serial No. 593,086

16 Claims. (Cl. 222—76)

This invention relates to a liquid dispenser and in particular to a hot water dispenser of the open-to-atmosphere type.

One form of liquid dispenser is that wherein a tank is provided with an outlet which is open to atmosphere at all times, and liquid flow through the tank and from the outlet is controlled by means associated with the inlet to the tank. In such a device, when the liquid flow into the tank is terminated, all liquid above the bottom of the outlet flows substantially immediately from the tank through the outlet. However, should the level of the liquid be raised subsequently above the bottom of the outlet due to any cause, this additional liquid will be discharged through the outlet. Such a result could be produced merely by moving the tank so as to affect the liquid level, e. g., by tilting the tank or vibrating it.

This subsequent discharge or dripping of the liquid from the tank through the outlet may also result where a temperature variation in the liquid occurs, as the coefficient of thermal expansion of liquids such as water is sufficient to cause a substantial volume change over a relatively small temperature range. In water heating devices for raising liquid, such as tap water, to substantially boiling temperature, this is a very serious problem.

Applicants have devised and herein disclose and claim a new and improved liquid dispensing means of the open-to-atmosphere type and arranged to prevent positively undesirable discharge.

A principal object of the invention is to provide a new and improved hot water dispenser of the open-to-atmosphere type which is non-dripping, when the flow therefrom is terminated.

Another object of the invention is to provide a hot water dispenser wherein means are provided for maintaining the outlet above the level of the free liquid in the tank whenever liquid flow into the tank is terminated.

Still another object is to provide a hot water dispenser having means for withdrawing a volume of liquid from below the outlet when liquid flow into the tank is terminated.

A further object is to provide a hot water dispenser having means for positioning the outlet substantially above the level of the liquid in the tank when the liquid flow thereinto is terminated.

A still further object is to provide a hot water dispenser having piston means acting alternatively to withdraw and insert a volume of liquid from and into the tank below the level of the outlet and operably associated with means for controlling the flow of liquid into the tank to withdraw liquid from the tank when flow into the tank is terminated.

A yet further object is to provide a hot water dispenser of the open-to-atmosphere type having an inlet duct with a portion forming a venturi, a receptacle at the level of the outlet, and a duct communicating with the interior of the receptacle and with the venturi for controlling the level of the free liquid in the tank.

Yet another object is to provide such a hot water dispenser wherein the venturi means acts to produce a pneumatic pressure condition effecting the desired level control.

Other features and advantages of this invention will be apparent from the following description taken in connection with the accompanying drawings wherein:

Figure 3 is a perspective view of another form of dispenser embodying the invention, with portions thereof shown in diametric section, and with the electrical wiring shown diagrammatically;

Figure 4 is a fragmetary view of the dispenser of Figure 3 with the parts thereof shown in a flow shutoff position;

Figure 1:
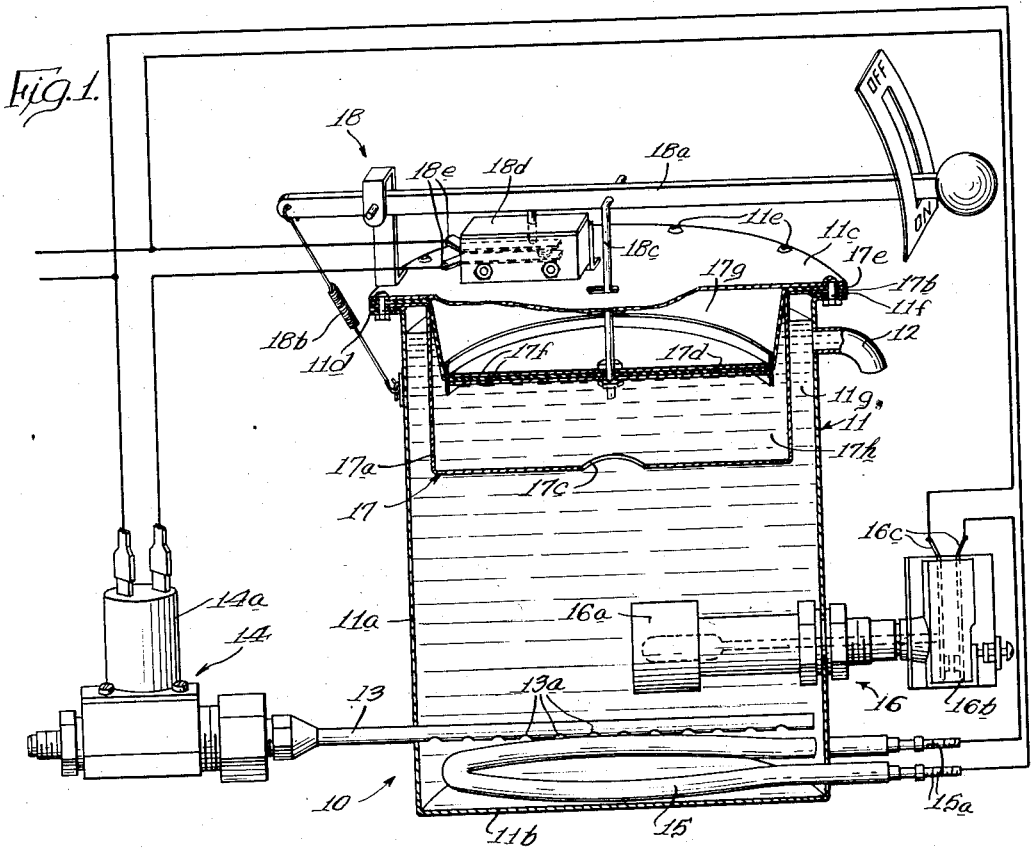
Figure 1 is a perspective view of a hot water dispenser embodying the invention, with portions thereof shown in diametric section, and with the electrical wiring shown diagrammatically.
Figure 2:
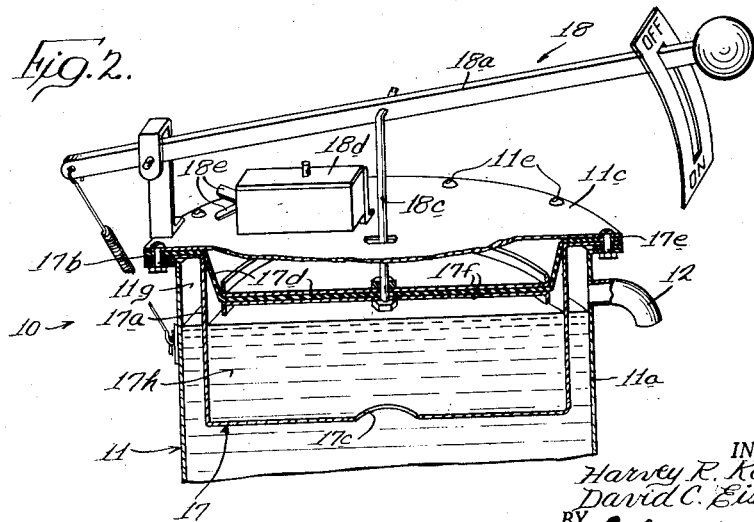
Figure 2 is a fragmentary view of the dispenser of Figure 1 with the parts thereof shown in a flow shutoff position.

In the exemplary embodiment of the invention as disclosed in Figures 1 and 2 of the drawings, a hot water dispenser generally designated 10 is seen to comprise a tank 11 having an outlet 12 and an inlet 13. Flow control means 14 are provided to regulate flow of supply water through inlet 13 into tank 11. Extending into tank 11, adjacent the bottom thereof, is heating means 15 and thermostatic control means 16 arranged to control the energization of heating means 15 and thereby the temperature of the liquid in tank 11. A liquid level control means 17 is provided in the tank for regulating the free liquid level of water in the tank so that it will always be below outlet 12 when there is no flow into the tank through inlet 13. For concurrently operating level control means 17 and flow control means 14, operating means 18 are provided. In this embodiment, operating means 18 causes level control means 17 to function as a piston-cylinder device wherein the piston is moved into the liquid volume of the tank when liquid is flowing into the tank through inlet 13, and to move outwardly and withdraw liquid from the free volume of the tank when the flow control means is actuated to stop flow of liquid into the tank.

Tank 11 is illustratively shown as a cylindrical tank, having a side wall 11a, a bottom 11b, and a removable cover 11c. At its upper end, the side wall may be provided with a laterally outwardly extending flange 11d arranged to receive suitable bolt securing means 11e for retaining fixedly the cover thereon. Spaced slightly below side wall flange 11d, is outlet 12 which comprises an opening in the side wall and may include suitable spout means as desired.

Inlet 13 comprises a tubular element extending through wall 11a adjacent tank bottom 11b and with a plurality of discharge openings 13a therethrough within tank 11. At its outer end, inlet tube 13 is connected to the flow control means 14 which illustratively comprises a solenoid operated valve adapted to be in the valve-opened position when its solenoid 14a is energized and in the valve-closed position when the solenoid is deenergized. Valve 14 is further adapted to be connected to a source of liquid such as cold water under pressure (not shown).

Heating means 15 illustratively comprises an electrical heating coil which passes through wall 11a and is disposed within the tank between tank bottom 11b and inlet tube 13. Suitable terminals 15a are provided at the end of the coil exteriorly of tank 11 for electrical connection to a suitable source of electrical power (not shown). Thermostatic control means 16 includes a sensing element 16a extending through tank wall 11a and into the tank somewhat above inlet 13 and heating coil 15. A switch element 16b carried on the end of sensing element 16a exteriorly of tank 11 is arranged to be actuated by the sensing element so as to be closed when the temperature of the liquid in tank 11 is below a predetermined point. Terminals 16c are provided on switch element 16b and are arranged to effect a series connection of the switch with heating coil 15 across the power supply. Thus, heating coil 15 is energized whenever the temperature of the liquid falls below the predetermined point.

Means 17 for controlling the free liquid level in tank 11 comprises a hollow receptacle or housing 17a having an annular flange 17b extending laterally outwardly from its upper end to be received between tank flange 11d and cover 11c for supporting the housing to extend downwardly into the top of tank 11 to a point below outlet 12. An opening 17c is provided in the lower end of the housing to afford communication between the interior of the housing and the free interior of tank 11 below outlet 12. The lateral extent of housing 17a is made only slightly less than that of tank 11 so that a relatively small annular space 11g is provided therebetween. A diaphragm 17d is arranged to extend across the upper end of housing 17a with its peripheral edge 17e received between housing flange 17b and cover 11c. Diaphragm 17d comprises an extensible member preferably formed of a yieldable sheet and is provided with reinforcing plates 17f affording rigidity to the central portion thereof. An annular gasket 11f is disposed between tank flange 11d and the bottom of housing flange 11b so that when bolt securing means 11e are drawn up, cover 11c, diaphragm 17d, housing 117a, and tank wall 11a are sealingly connected, with resulting chambers 17g and 17h being formed in housing 17a.

A lever 18a is provided as one element of operating means 18 and is pivotally connected adjacent one end to cover 11c. A spring 18b is provided for biasing lever 18a to "off" position. Extending downwardly from the mid portion of lever 18a is a rod 18c which passes through cover 11c and is secured at its inner end to the reinforced mid-portion of diaphragm 17d so that, when lever 18a is pivoted downwardly to the "on" position, diaphragm 17d is correspondingly lowered. An electrical switch 18d is provided which is illustratively shown as mounted on cover 11c to be operated by lever 18a concurrently with its operation of diaphragm 17d so that the switch is closed when the diaphragm is moved downwardly and opened when the diaphragm is moved upwardly. Terminals 18e are provided on switch 18d and are arranged to provide a series connection of switch 18d and solenoid 14a of valve 14 across the electrical power supply.

Having described the elements of our hot water dispenser, the operation thereof will now be made clear.

The heated water in tank 11 is caused to be disposed therefrom by admitting additional water into the tank through inlet 13. To this end, handle 18a is pivoted in a clockwise direction to the "on" position as seen in Figure 1, acting to close switch 18d and energize solenoid 14a, thereby opening valve 14 and admitting supply water through inlet 13 into tank 11. At the same time, operating means 18 through rod 18c forces diaphragm 17d downwardly through housing 17a to displace a substantial volume of water from the housing and into the free volume of water in the remainder of tank 11 to effect a substantially instantaneous discharge from outlet 12.

When sufficient hot water has been withdrawn, lever 18a is pivoted to the upper or "off" position, thereby opening switch 18d and causing solenoid valve 14 to close. All liquid above the bottom of outlet 12 tends to flow immediately outwardly therethrough. Should the level of liquid in the tank have risen above the top of outlet 12 (as illustratively shown in Figure 1), pressure is built up in the space above the water, as this space is sealed by the water and the action of gasket 11f against housing flange 11b and tank flange 11d. This pressure augments the gravitational force acting to urge immediately the excess water outwardly through the outlet 12.

As the portion of lever 18a to which arm 11c is secured is moved upwardly, diaphragm 17d is also moved upwardly, thereby enlarging the volume of sealed chamber 17h. Thus, the diaphragm acts as a piston device, drawing water from the free volume in tank 11 upwardly through housing opening 17c and into chamber 17h. The quantity of water so drawn into the housing is controlled by the area of the diaphragm and the distance it is moved by rod 18c, it being obvious that a desirable variation in the quantity may thus be obtained through suitable changes in these factors. In the specific embodiment now being described, it is preferred that the volume of water withdrawn be at least equal to the increase in volume occasioned by the heating of the water in the tank. As the incoming water is relatively cool, some period of time will ordinarily be required for elevating its temperature to the desired temperature. This heating ordinarily occurs subsequent to the withdrawal of previously heated water from the device. Thus, it is desirable to withdraw from the free volume of the tank sufficient water so that when the entire volume of water in the tank is heated to the desired temperature the expansion thereof will be accommodated and the level thereof will remain below the bottom of outlet 12. Illustratively, we have found that with a tank arranged to hold nine pints of water, withdrawal of five ounces of water accommodates the expansion due to raising the water from 32° F. to 212° F.

The lateral area of diaphragm 17d is preferably made substantially greater than the lateral area of space 11g between housing 17a and tank wall 11a. Thus, a given vertical displacement of the diaphragm produces a substantially larger vertical displacement of the level of liquid in space 11g as the volume of water removed from space 11g from below outlet 12 must be equal to the volume of water drawn into chamber 17h by the diaphragm. Thus, means are provided for magnifying the drop of the liquid level below the outlet relative to the movement of lever 18a, assuring drip-proof operation of the device.

In Figures 3 and 4, a modified form of hot water dispenser 110 embodying our invention is shown to comprise a tank 111 similar to tank 11. An inlet 113, flow control means 114, heating means 115, and thermostatic control means 116 are provided, each being similar to and functioning similarly as the corresponding elements of dispenser 10. An outlet 112 is provided in side wall 111a comprising an opening 112a preferably formed as a vertically elongated slot. A block 112b is secured to wall 111a by suitable screws 112c with a gasket 112d therebetween for sealing the connection. A recess 112e opening through one side of the block is arranged to be in communication with the entirety of slot 112a and, extending vertically through the block and recess 112e, is an open ended discharge tube 112f. A relatively small hole 112g is provided in the wall of the tube to provide communication between the interior of the tube and recess 112e, allowing liquid to pass from the tank through the recess and outwardly through the tube. O-ring sealing means 112h are provided in block 112b for preventing leakage from outlet 112 while permitting vertical positioning of the tube and therefore the positioning of hole 112g relative to the block.

A housing 117a, similar to housing 17a, except that no opening is provided in the bottom thereof, is arranged to extend from the top of tank 111 downwardly to below the bottom of slot 112a. Operating means 118 are provided, similar to operating means 18, except that a yoke 118c, connecting the lever 118a to tube 112f, is provided in lieu of the rod 18a.

As seen in Figure 4, when lever 118a is pivoted to the "off" position, hole 112g is positioned substantially above the water in the tank 111 and recess 112e which, in effect, increases the effective volume of the tank for holding the water. This prevents dripping of water from tube 112f unless flow control means 114 is closed. As seen in Figure 3, when lever 118 is pivoted to the "on" position, hole 112g is moved to its lower limit of travel, horizontally of the bottom of slot 112a, and normal dispensing from the dispenser is allowed.

Figure 5:
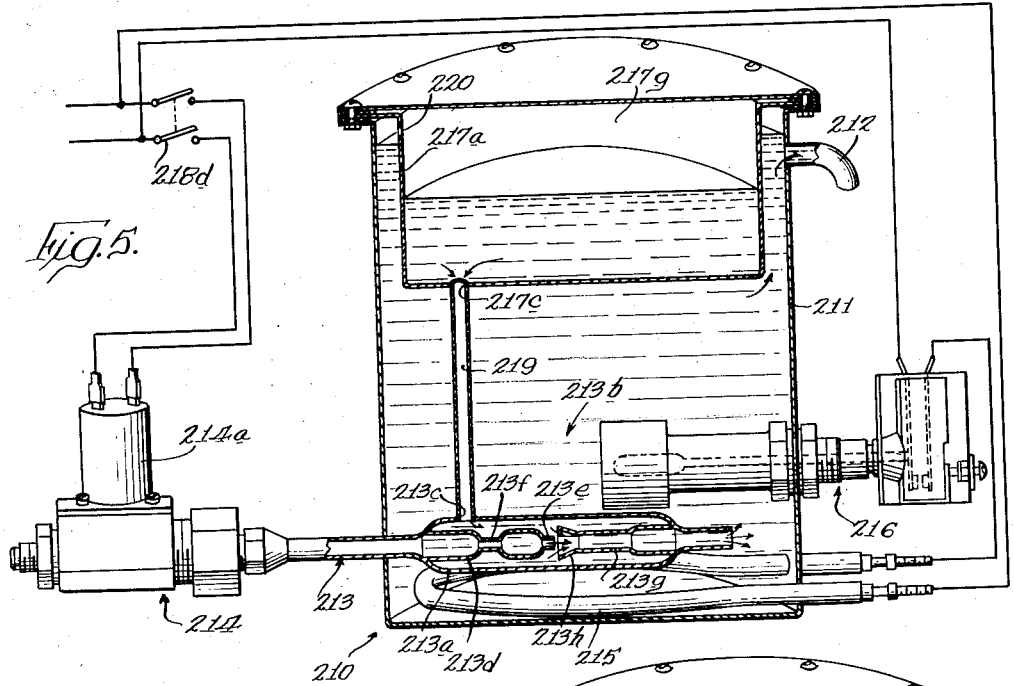
Figure 5 is a perspective view of another form of hot water dispenser embodying the invention, with portions thereof shown in diametric section, and with the electrical wiring shown diagrammatically.
Figure 6:
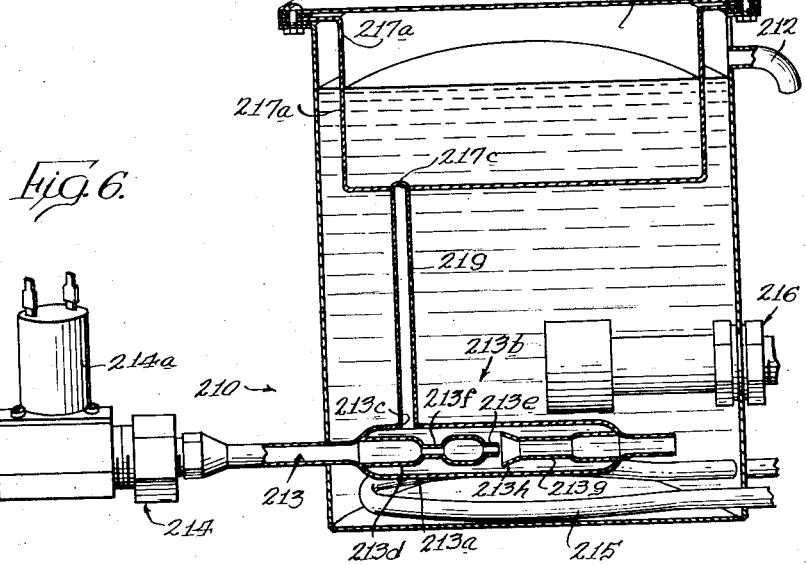
Figure 6 is a fragmentary view of the dispenser of Figure 5 with the parts thereof shown in a flow shutoff position.

Still another form of hot water dispenser 210 embodying the invention is shown in Figures 5 and 6. In this construction, a tank 211, outlet 212, flow control means 214, heating means 215, and thermostatic control means 216 are provided similar to the corresponding elements of the first described embodiment. A supply tube 213 is provided having a diametrically enlarged portion 213a within tank 211 and with venturi means 213b carried therein. Adjacent the inlet of portion 213a an opening 213c is provided therethrough. A housing 217a, similar to housing 17 except that an opening 217c in the bottom thereof may be positioned adjacent the vertical wall thereof in vertical alignment with the opening 213c, is provided. A duct 219 extends between housing opening 217c and supply tube opening 213c to have communication with the venturi means 213b and the interior of housing 217a. A pressure relief opening 220 in the upper wall portion of the housing provides communication between the interior of tank 211 at the upper end thereof, and with air space 217g above the level of the liquid in housing 217a.

Venturi means 213b includes an inlet tube 213d forming a water conducting extension of supply tube 213 within enlarged portion 213a. A diametrically reduced end 213e and mid portion 213f are provided in inlet tube 213d for effecting a proper pressure reduction in the water leaving end 213e. An outlet tube 213g extends longitudinally outwardly from inlet tube end 213e and through enlarged portion 213a to distribute water from supply tube 213d to the interior of tank 211. The inner end 213h of outlet tube 213g is radially flared outwardly and positioned adjacent inlet tube end 213e to act in cooperation with end 213e as aspirating means in drawing water from enlarged portion 213a surrounding the inlet and outlet tubes.

In the operation of the embodiment of Figures 5 and 6, a switch 218d, connecting solenoid 214a of the flow control means 214 to a suitable source of power, is closed to open the valve and permit water flow into the tank through supply tube 213 and thus through venturi means 213c. As seen in Figure 6, just prior to the starting of water flow, the level of water in housing 217a is the same as the level of the water exteriorly of the housing in tank 211. However, the aspirating action produced by means 213b effects a withdrawal of water from housing 217a through duct 219 to lower the level in the housing substantially below the level of the water exteriorly thereof in tank 211, as seen in Figure 6. As opening 220 provides communication between space 217g and the upper portion of tank 211 exteriorly of the container, relief of pressure in air space 217g is effected permitting the lowering of the level in housing 217a as desired.

When switch 218d is opened, thereby operating flow control means 214 to stop flow of water into the tank through inlet tube 213, the level of water in housing 217a tends to align itself with the free level of the water exteriorly of the housing in tank 211 by passing backwardly through outlet tube 213g enlarged portion 213a, duct 219, and into the housing. The volume of water withdrawn from the housing may be controlled by the venturi pressure and the physical characteristics of the dispenser so that the volume will be at least equal to the incremental change in volume due to the heating of the water in the tank. Similar to the effect produced in the embodiment of Figures 1 and 2, housing 217a provides a magnification of the vertical displacement of the free liquid level in tank 211, exteriorly of housing 217a, thereby assuring drip-proof operation of the device.

Figure 7:
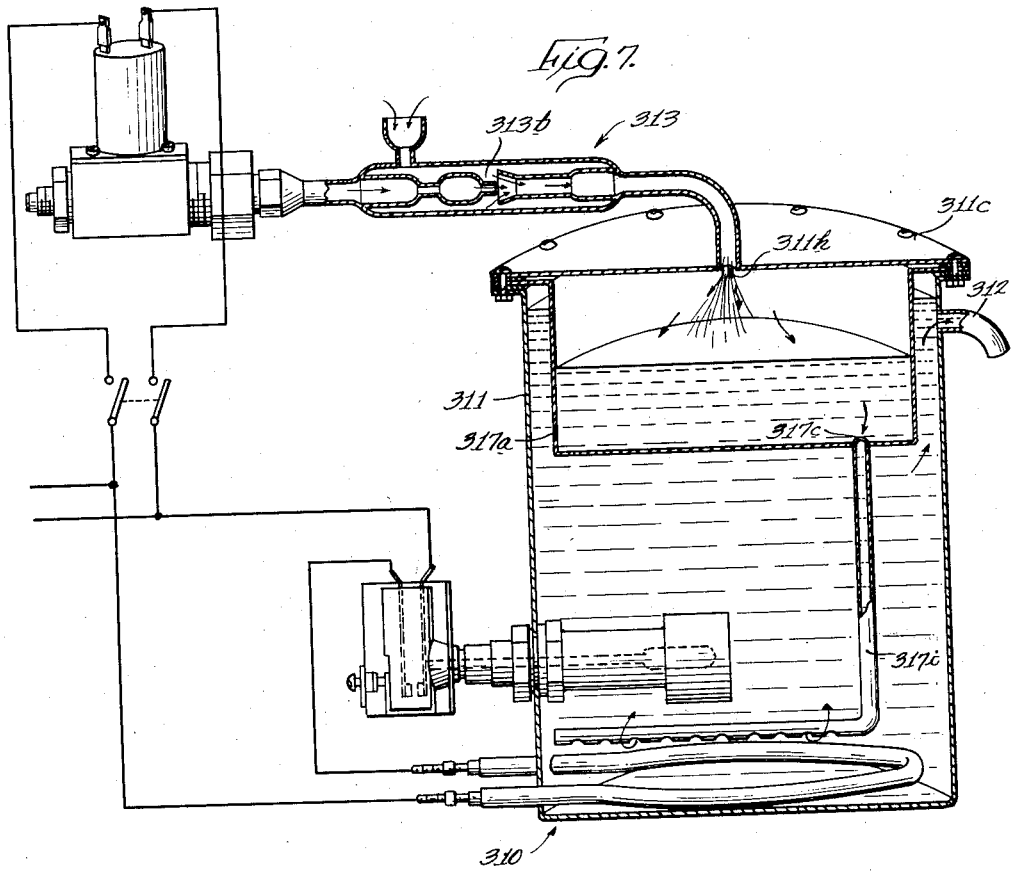
Figure 7 is a perspective view of still another form of hot water dispenser embodying the invention, with portions thereof shown in diametric section, and with the electrical wiring shown diagrammatically.
Figure 8:
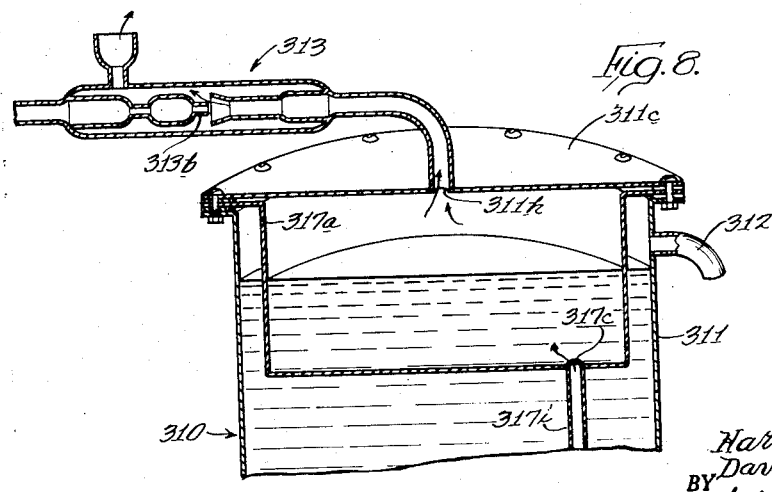
Figure 8 is a fragmentary view of the dispenser of Figure 7 with the parts thereof shown in a flow shut-off position.

A fourth form of hot water dispenser 310 is shown in Figures 7 and 8 wherein a tank 311, generally similar to tank 211, is provided with an inlet opening 311h in the cover 311c. An inlet 313 is secured at one end to cover 311c to have communication through opening 311h with the interior of a receptacle 317a. Receptacle 317a is generally similar to receptacle 217a of the embodiment of Figures 5 and 6 but has no relief opening in the side wall thereof. Inlet 313, having a venturi means 313b, is similar to inlet 213, but, as it is disposed exteriorly of tank 311, acts to suck air into the liquid stream passing therethrough, which air is then deposited in receptacle 317a. The receptacle is sealed to cover 311c and thus, during flow of liquid into the receptacle, a pneumatic pressure is developed in the upper portion thereof.

An opening 317c in the bottom of receptacle 317a allows passage of liquid from the receptacle into the main body of tank 311. To distribute the liquid into the tank at the lower portion thereof, a distributing tube 317i extends downwardly from opening 317c. As may best be seen in Figure 7, when liquid is flowing through dispenser 310, the air pressure developed in receptacle 317a causes the level of liquid therein to fall below the level of the tank outlet 312. This lowered liquid level is maintained during the dispensing of the liquid from the tank. However, as may best be seen in Figure 8, when the liquid flow is discontinued, the air pressure in the upper portion of receptacle 317a is relieved backwardly through the venturi 313b, thereby allowing the level of the liquid in the receptacle to rise, and consequently effect a lowering of the free liquid level in tank 311 to below the level of outlet 312. In all other respects, the operation of the embodiment of Figures 7 and 8 is similar to the operation of the embodiment of Figures 5 and 6.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. A hot liquid dispenser, comprising: a tank having an upper end; an outlet near said upper end; an inlet communicating with the interior of said tank below said upper end; means for heating liquid in said tank; thermostatic means having a sensing element in said tank below said outlet for controlling the heating means; means for effecting and terminating flow of liquid through said inlet and into said tank; and means for withdrawing automatically otherwise than through said outlet a volume of liquid from said tank to lower the level of the liquid adjacent said outlet to below the outlet whenever flow into said tank is terminated.

2. A liquid dispenser, comprising: a tank having an upper end; an outlet near said upper end; an inlet communicating with the interior of said tank below said upper end; means for effecting and terminating flow of liquid through said inlet and into said tank; a piston housing having an open end communicating with said tank below the outlet; and a reciprocable piston element in said housing for withdrawing a volume of liquid in said tank to lower the level of the liquid adjacent said outlet to below the outlet whenever admittance into said tank is terminated.

3. A liquid dispenser, comprising: a tank having an open outlet and an inlet; means for starting and stopping flow of liquid through said inlet and into said tank; a housing communicating with said tank below the outlet; and an extensible diaphragm across said housing movable to one position, when liquid is flowing into said tank, where it displaces a volume of free liquid in the tank and to another position when the liquid flow is stopped to withdraw a volume of free liquid from said tank to lower the level of the liquid adjacent said outlet to below the outlet.

4. A vented-to-atmosphere liquid dispenser, comprising: a closed tank; an open-to-atmosphere outlet from said tank; an inlet to said tank; means to start and stop flow of liquid through said inlet and into the tank; a rigid housing having a portion in said tank with an opening below the outlet; a diaphragm having a periphery sealingly secured to said housing and a mid-portion extending movably across the interior of the housing; and means to move said diaphragm mid-portion to enlarge the portion of the housing interior in communication with the opening whenever the liquid flow is stopped, thereby to withdraw liquid from the tank exteriorly of the housing portion therein to within the housing and to lower the level of the liquid in the tank to below the outlet.

5. A vented-to-atmosphere liquid dispenser, comprising: a tank; a cover for closing the tank; an open-to-atmosphere outlet from said tank; an inlet to said tank; means to start and stop flow of liquid through said inlet and into the tank; a rigid housing having a portion in said tank with an opening below the outlet and an annular flange portion extending between the cover and the tank; a diaphragm having a periphery sealingly clamped between said housing and a mid-portion extending movably across the interior of the housing; and means to move said diaphragm mid-portion upwardly to enlarge the portion of the housing interior in communication with the opening whenever the liquid flow is stopped, thereby to withdraw liquid from the tank exteriorly of the housing portion therein to within the housing and to lower the level of the liquid in the tank to below the outlet.

6. A vented-to-atmosphere liquid dispenser, comprising: a tank; a cover for closing the tank; an outlet from the tank; an inlet to the tank; a solenoid valve arranged to start and stop flow of liquid through said inlet and into the tank; a rigid housing having a portion in the tank with an opening below the outlet; a diaphragm having a periphery sealingly secured to said housing and a mid-portion extending movably across the interior of the housing; a switch for energizing and deenergizing the solenoid valve; and rod means adapted to operate said switch to close the valve and concurrently to move said diaphragm mid-portion to enlarge the portion of the housing interior in communication with the opening, thereby to withdraw liquid from the tank exteriorly of the housing portion therein to within the housing and to lower the level of the liquid in the tank to below the outlet.

7. A vented-to-atmosphere liquid dispenser, comprising: a closed tank; an open-to-atmosphere outlet from the tank; an inlet to the tank; means to start and stop flow of liquid through the inlet and into the tank; a rigid housing having a portion in said tank disposed horizontally of the outlet and extending to below the outlet, and an opening in the housing below the outlet; a diaphragm having a periphery sealingly secured to said housing and a rigid mid-portion extending movably across the interior of the housing, with the area of the mid-portion being greater than the area of the portion of a horizontal plane drawn through the bottom of the outlet and extending between the housing and the tank wall; and means to move said diaphragm mid-portion to enlarge the portion of the housing interior in communication with the opening whenever the liquid flow is stopped, thereby to withdraw liquid from the tank exteriorly of the housing portion therein to within the housing and to lower the level of the liquid in the tank to below the outlet.

8. In a liquid dispenser, means of the character described, comprising: a tank; an outlet from said tank; an inlet below said outlet and having a member extending into the interior of said tank having a passage therethrough for admitting a liquid into said tank, said passage having a portion of reduced transverse area; a receptacle arranged to extend below said outlet; and a duct communicating with the interior of the said receptacle and with the reduced portion of said passage, and acting to permit transfer of liquid from and into said receptacle to maintain the level of liquid in the tank below the outlet when liquid flow is terminated.

9. In a hot liquid dispenser, means of the character described, comprising: a tank; means for heating the liquid in the tank; an outlet from said tank; an inlet below said outlet and having a member extending into the interior of said tank having a passage therethrough for admitting liquid into said tank, said passage having a portion of reduced transverse area; means for controlling liquid flow through said inlet; a receptacle in said tank arranged to extend to below the outlet; and a duct providing sealed communication between the interior of said receptacle and the reduced portion of said passage, said reduced portion and the liquid flow therethrough cooperatively acting to produce a negative pressure on the liquid in the tube sufficient to withdraw a volume of liquid from said receptacle at least equal to the increased volume of the liquid in the tank effected by the heating thereof by said heating means.

10. In a liquid dispenser, means of the character described, comprising: a tank having an upper end, a cover closing said upper end, and an opening spaced below the upper end and forming an outlet; an inlet having a member communicating with the interior of said receptacle and provided with a passage therethrough for admitting liquid into said tank, said passage having a portion comprising a venturi; a hollow receptacle in said tank and extending downwardly from said cover to below said outlet; pressure equalizing means comprising an opening in said receptacle above said outlet and communicating with the interior of the tank exteriorly of said receptacle and with the upper portion of the interior of the receptacle; and duct means having sealed communication with the interior of said receptacle below the outlet and with the venturi portion of said passage.

11. In a liquid dispenser, means of the character described, comprising: a tank; open outlet means for discharging liquid from the tank; inlet tube means for admitting liquid into the tank and having a venturi; means for effecting and terminating liquid flow through said inlet tube means; a receptacle arranged to extend to below the level of the outlet; duct means communicating with the venturi and with the receptacle below the level of the outlet permitting the withdrawing of liquid from the receptacle when liquid is being admitted to the tank and for admitting liquid to the receptacle when liquid flow into the tank is terminated, whereby the level of the liquid in the receptacle is made to be respectively lower than, and the same as, the level of the liquid in the tank.

12. In a liquid dispenser, means of the character described, comprising: a tank having an open outlet near the top thereof; and means for admitting liquid to the tank including a receptacle at the level of the outlet and extending to below the outlet level and having a closed top portion, an inlet tube for connecting the receptacle to a liquid supply and having a venturi adapted to suck air into liquid passing therethrough and into the receptacle, and means for conducting liquid between the receptacle and the interior of the tank below the outlet, whereby air is forced into said receptacle during flow of liquid into the tank to lower the level of liquid in the receptacle to below the level of the outlet while the level of the liquid in the tank is raised to at least that of the outlet.

13. In a liquid dispenser, means of the character described, comprising: a tank having an open outlet near the top thereof; a cover sealingly closing the top of the tank and having an inlet opening; and means for admitting liquid to the tank including a receptacle in the tank at the level of the outlet and extending to below the outlet level and sealingly closed at the top thereof by said cover, an inlet tube sealingly connected to the cover at said inlet opening for connecting the receptacle to a liquid supply and having a venturi adapted to suck air into liquid passing therethrough and into the receptacle, and means for conducting liquid between the receptacle and the interior of the tank below the outlet, whereby air is forced into said receptacle during flow of liquid into the tank to lower the level of liquid in the receptacle to below the level of the outlet while the level of the liquid in the tank is raised to at least that of the outlet.

14. A liquid dispenser comprising: a tank having an upper end; an outlet near said upper end; an inlet communicating with the interior of said tank below said upper end; means for effecting and terminating flow of liquid through said inlet and into said tank; and means for withdrawing automatically otherwise than through said outlet a volume of liquid from said tank to lower the level of the liquid adjacent said outlet to below the outlet whenever flow into said tank is terminated.

15. The liquid dispenser of claim 14 wherein said means for withdrawing liquid from said tank includes a member fixedly associated with the tank and extending at all times horizontally of the outlet over more than half of the area of the free liquid level in the tank contiguous with the outlet.

16. A drip-proof liquid dispenser comprising: a closed tank having a top; an open outlet through the tank at the top; means for effecting liquid flow into the tank; means for heating liquid in the tank; and means for lowering the liquid level in the tank to below the outlet when liquid flow therethrough is discontinued, including an enclosure, passage means communicating between the interior of the enclosure and the interior of the tank below said outlet to allow a quantity of liquid to be disposed within said enclosure, and means associated with said enclosure operable substantially immediately subsequent to an operation of said means for effecting a liquid flow into the tank to induce flow of liquid into said enclosure from the liquid in the tank.

References Cited in the file of this patent

UNITED STATES PATENTS

| 1,602,686 | Leet | Oct. 12, 1926 |
| 2,464,714 | Petersen | Mar. 15, 1949 |

FOREIGN PATENTS

| 529,213 | Great Britain | Nov. 15, 1940 |